INVENTORS
M. W. FORTH
W. M. ROLL
G. W. JENKINS

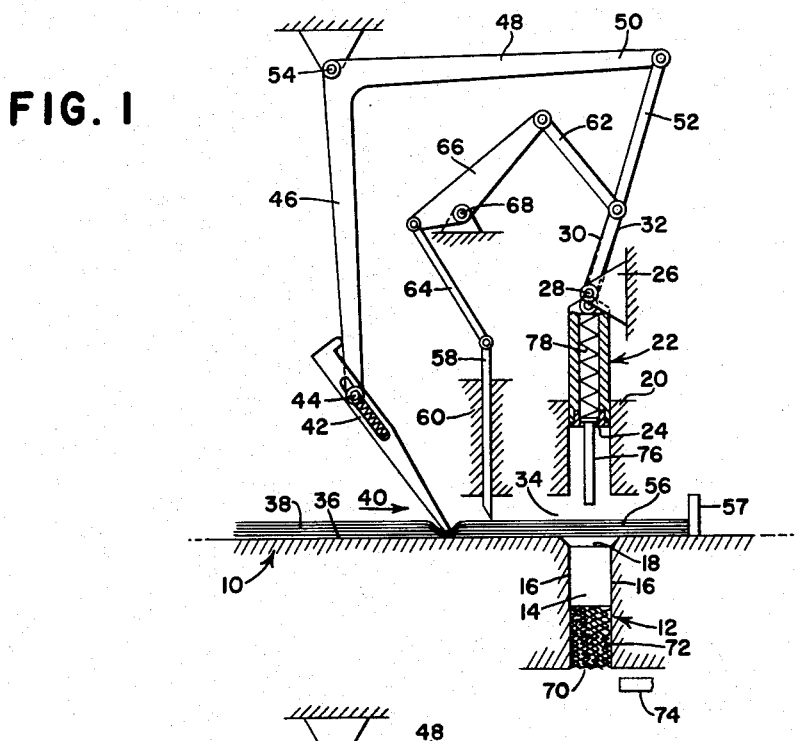
FIG. 1
FIG. 2
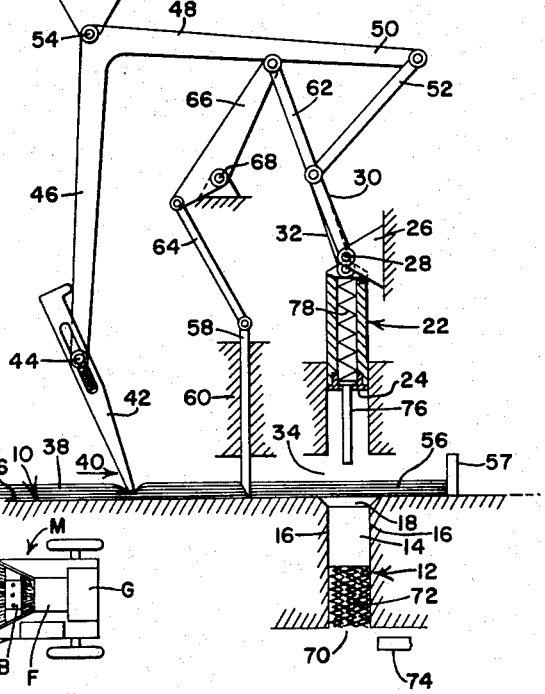
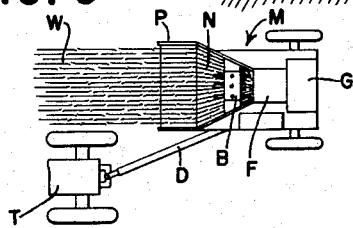
FIG. 9
INVENTORS
M. W. FORTH
W. M. ROLL
G. W. JENKINS

June 1, 1965  M. W. FORTH ETAL  3,186,360
WAFERING APPARATUS

Filed Jan. 2, 1962  4 Sheets-Sheet 3

INVENTORS
M. W. FORTH
W. M. ROLL
G. W. JENKINS

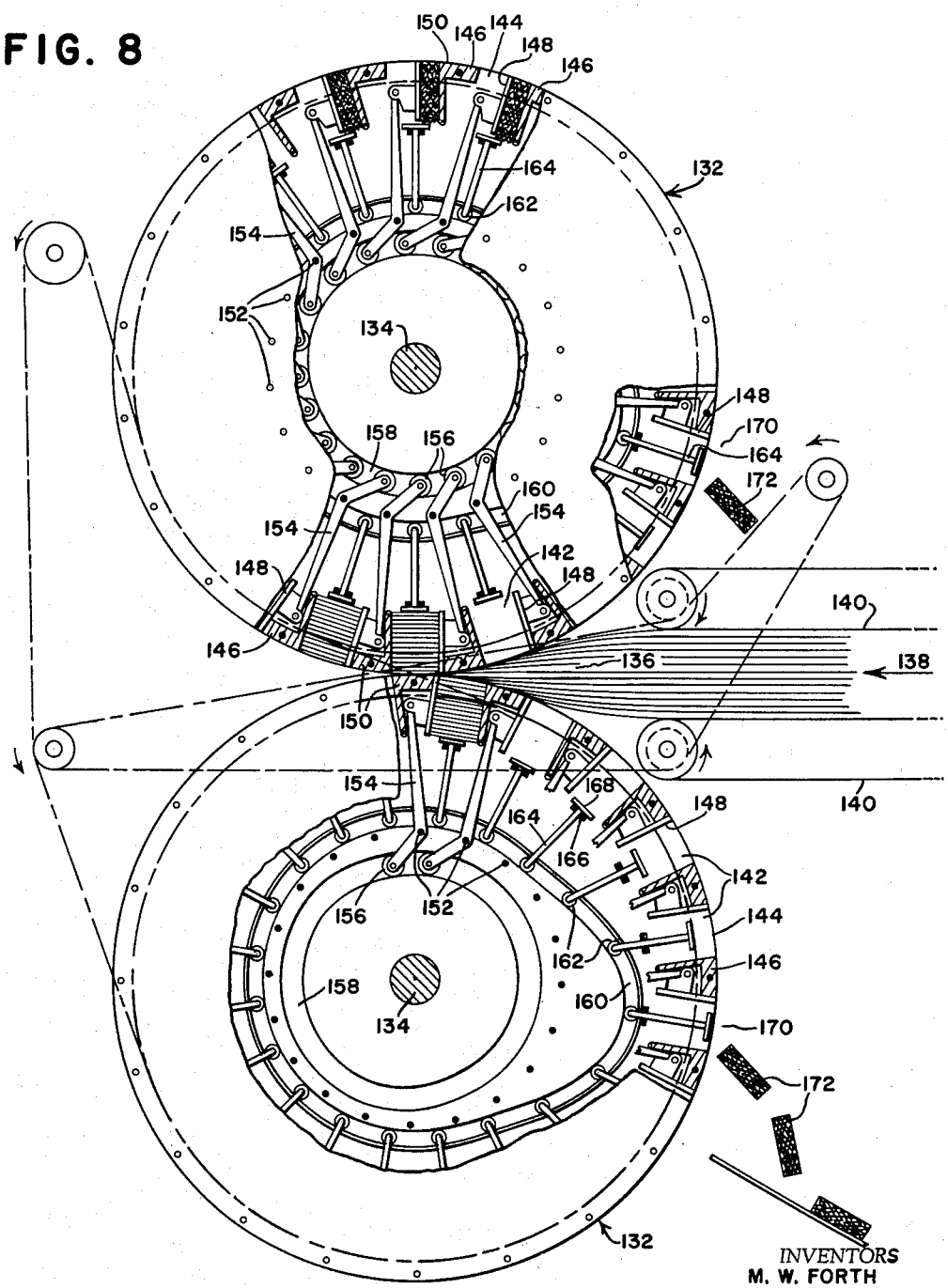

3,186,360
WAFERING APPARATUS
Murray W. Forth and Walter M. Roll, Moline, and Glenn W. Jenkins, East Moline, Ill., assignors to Deere & Company, Moline, Ill., a corporation of Delaware
Filed Jan. 2, 1962, Ser. No. 163,409
9 Claims. (Cl. 107—14)

This invention relates to wafering apparatus or machine and more particularly to such machine as specially adapted for the handling of agricultural or forage crops and similar material, such as hay, straw, alfalfa and the like, which is made up largely of stalks, stems, etc.

Recent developments in the field of wafering or pelleting of forage and similar agricultural crops have demonstrated that in the over-all picture the processes and machines to date show considerable promise, and at the same time, of course, leave room for substantial improvement. Experience has also shown that it is virtually impossible to draw on the art of stationary machines for producing pellets or equivalent extrusion products as relatively small articles for animal feed, since the differences in the types of material handled require substantially different processes and machines. In the well-known stationary machines, considerable success has been attained in the handling of granular or pulverulent material by the simple process of extruding this material through openings in an annular die or ring by means of a roller or set of rollers operating on the periphery of the annulus. Since that material is of a relatively uniform moisture content, and further because of its pulverulent nature, very few difficulties have been encountered. On the other hand, agricultural products, such as forage crops, present a myriad of situations which cannot be readily dealt with. Most of these situations or problems involve variations in moisture content, differences in frictional and compressibility characteristics, possible chemical changes in the crop and the ability or lack of ability of the material to adhere or stick together in wafer or pellet form.

In prior machines for handling forage and allied crops, the mechanisms for feeding, compacting and extrusion have by chance, a natural tendency to place the material over one or more die openings in such a fashion that stalks, stems, and the like lay predominantly crosswise of the path through which the forces of compaction and extrusion are applied. Thus, as successive charges are accumulated in the die opening or cell, a laminar effect is achieved; that is, each charge forms a layer on top of the previous charge. In addition to the requirements that the laminated stalks in each charge adhere to each other, the structural strength of the tubular or cylindrical stems must be destroyed by flattening to prevent rebound and swelling of the compressed charge. Excessively high pressures are required to destroy a tubular shape when so oriented and surrounded in a laminar fashion. It is found that the adhesion within the laminar charge is due largely to what may be regarded as adhesive bonding of the material particles because of the high pressure applied, which in turn indicates that expression of juices and other moisture is significant. This is clearly demonstrated by a comparison of the end products of relatively moist and relatively dry material, the former having substantially better adhesive bond than the latter. However, when there is excessive moisture present the bonding agent appears to be too diluted to be effective, and the pressures required to crush the tubular stems relatively full of incompressible fluid becomes excessive. Moreover, legume crops appear to contain a more adhesive bonding agent in their juices than is present in grasses and cereal crops. In some instances, moisture or other agents are added to the material in an attempt to improve its adhesive bond. However, the adhesive bonding of hay crops that contain less than 50% legume crops is not dependable.

The magnitude of the problem increases because the nature of material varies not only from crop to crop but also in the same crop at different portions of the field or even in different portions of the same windrow. It is even logical to assume that, therefore, the material characteristics will vary from charge to charge, and pellets will be found containing a relatively dry charge superimposed upon a relatively wet charge. Such problems as this extend considerably beyond the mere operation of the machine, because an adequate wafer or pellet must not only be formed and ejected by the machine without substantial interruption of its operation, but such wafer or pellet must withstand handling by material-transfer systems between the machine, storage and ultimate consumption. Wafers processed by a system relying upon extremely high pressures and expensive machines are of little value if they disintegrate in handling.

It is therefore the principal object of the present invention to provide a novel system of wafering or pelleting in which the material is orientated and retained in a manner such that it will be subjected to a pressure endwise of the lengths of the stems, stalks and the like, whereby the stems and stalks are caused to buckle so that portions thereof are randomly displaced laterally of the line of force so as to establish a mechanical interlace or interlock with adjacent stalks and stems similarly subjected to endwise pressure. In other words, the displaced buckled or crimped portions of adjacent stalks and stems interlace with each other in such manner as to form a wafer or pellet in which moisture content or chemical bonding of the material is not tremendously critical. Apparatus of this character will handle a mixed variety of forage crops; that is, a variety that is mixed from charge to charge or even in the same charge, it being not uncommon that different types of grasses, for example, will grow in the same field and will be harvested at the same time. For example, in an ideal situation involving substantially pure alfalfa, relatively good results are obtainable by the prior laminar process in which one charge is superimposed upon another in layer-upon-layer form. However, if other materials, such as water grass or red clover, happen to be mixed with the alfalfa, the laminar form is not nearly as successful, but according to the process of the present invention, the mixture is capable of being wafered or pelleted in such manner that the end products are quite adequate, especially from the standpoint of durability in handling, storage and feeding. That is, experience has shown that stalks and stems which would not adhere in laminar form may be successfully wafered by the present invention which orients the material in a manner such that the forces are applied parallel with the lengthwise axis of the stems.

The foregoing and other important objects and desirable features inherent in and encompassed by the invention will become apparent as preferred embodiments thereof are disclosed in detail in the ensuing description and accompanying sheets of drawings, the figures of which are described below.

FIG. 1 is a schematic view, partly in section, of one form of the apparatus, the parts being shown in positions in which the material is fed to a charging zone between a pair of compressor elements.

FIG. 2 shows the same apparatus in a subsequent stage in which the material is being severed into a charge which will subsequently be fed to and compressed between the compressor elements.

FIG. 8 is a schematic illustration, again partly in section, showing a different form of the invention as embodied in a pair of annular means involving the principles previously outlined.

FIG. 9 is a small-scale view representing a typical field machine and the general construction thereof as embodying the invention in any of the previously illustrated forms or equivalents thereof.

Figure 3:
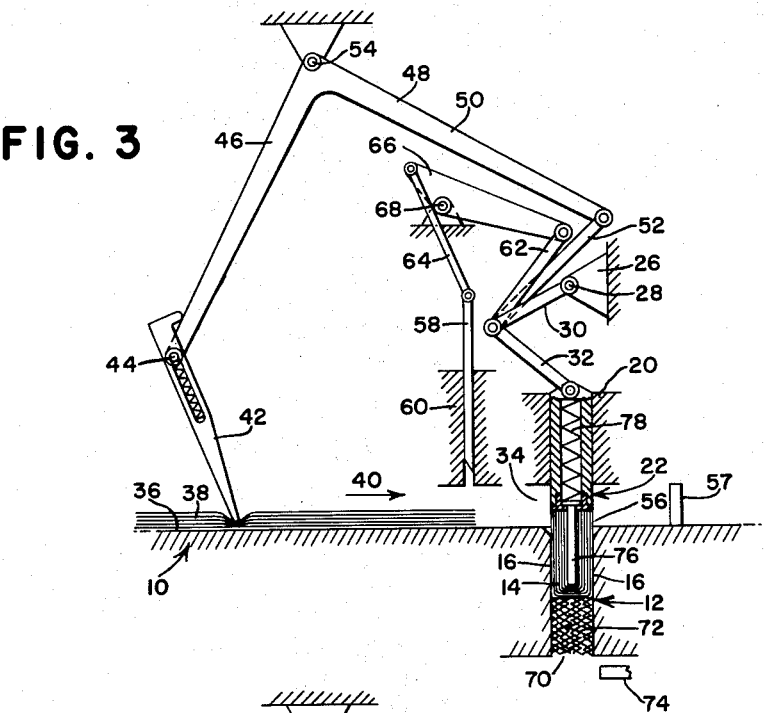
FIG. 3 shows the apparatus in a further stage in which the severed charge of material is being tucked or folded into the die cell afforded by one of the compressor elements.

For purposes of orientation, reference will be had first to FIG. 9. In this view, the wafering machine is indicated in its entirety by the letter M as being drawn over a field of agricultural or forage crops as by a tractor T, the wafering machine having its tongue D draft-connected to the tractor. The wafering machine is equipped with a pick-up means P, which may be of any conventional construction and which operates to pick up material or forage crop from a windrow W over which the machine advances. The pick-up may be of the type commonly used on agricultural balers, for example, a representative example of which is illustrated in assignee's patent to Hill 2,464,684.

Those familiar with the art in general will realize that the forage crop, being predominately made up of stalks, stems and the like will, when cut by a mower or equivalent harvester, fall rearwardly so that the material lies with the stalks and stems lengthwise or parallel to the line of travel, as illustrated in FIG. 9. The pick-up means includes fingers which rotate or travel in radial planes parallel to line of advance and therefore the material when picked up will largely retain its lengthwise pattern. It is further conventional to narrow the relatively wide stream or windrow as in the area N, but the lengthwise pattern is retained by the use of a beater or comber B, which again is equipped with teeth or the like to keep the material moving with the stalks, stems and the like predominantly parallel to the direction of movement. Movement of the material is continued by feed means F for ultimate delivery to the wafering means G. Subsequently, different types of feed and wafering means will be explained in connection with the several forms of the invention in FIGS. 1 through 8. For present purposes, suffice it to note wafers or pellets formed by the means G are ultimately discharged via a conveyor or the like (not shown) for transfer to a wagon or other accessory vehicle conventionally towed behind the machine M. The over-all practice in this respect is similar to that used in handling baled hay or even in connection with known wafering machines and therefore need not be illustrated here.

*FIGS. 1 through 4*

In this form of the invention, part of the wafering means suggested at G in FIG. 9 comprises support means, indicated here in its entirety by the numeral 10, one portion of which affords a compressor or resistor element 12, here affording a die cell 14 having opposed wall portions 16 and an inlet 18. Another portion of the support means affords a guide, as at 20, for a cooperative compressor element which is here a wall element or plunger 22 having a leading face portion 24. The guide 20 carries the plunger or wall element 22 for reciprocation or back and forth movement along a path generally normal to the plane of the wall element face portion 24. It will be further observed that the path of movement of the plunger 22 extends through the die cell inlet 18 and into the die cell. The cell and wall element or plunger are so proportioned that the plunger can enter the die cell, as will be brought out later.

Figure 4:
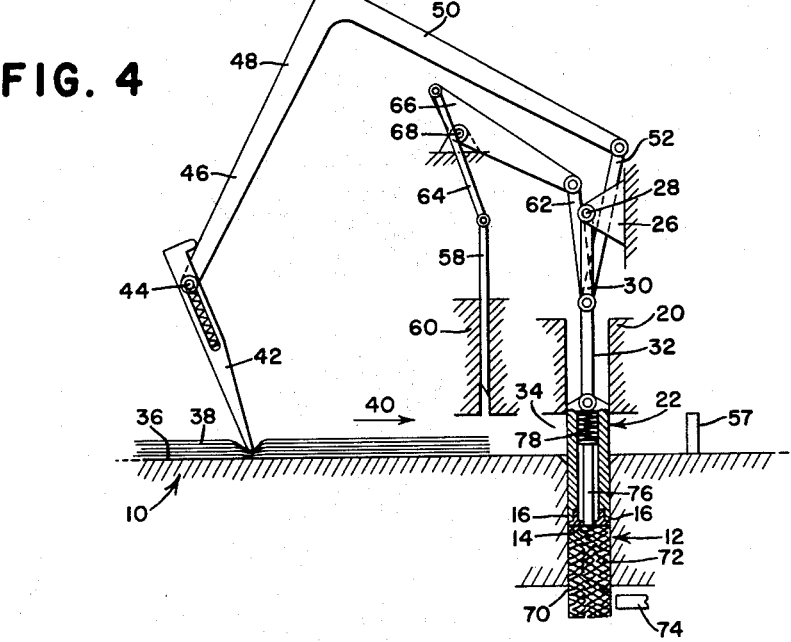
FIG. 4 shows a final state of the machine in which the cooperative compressor element moves into the die cell to compress the material tucked into the cell by the step of FIG. 3.

A further part of the support means 10 is represented by a bearing 26 which journals at 28 a crank 30 having a pitman or link connection 32 to the plunger 22, from which it follows that as the crank rotates, the plunger reciprocates between the positions of FIGS. 1 and 4. Consequently, material contained within the cell 14 will be engaged and compressed by the plunger. As the plunger returns to its FIG. 1 position, a further charge of material may be introduced to the space between the elements 22 and 12, which space may be referred to generally as a charging zone 34.

The support means 10 also affords what may be regarded as a feed area or surface 36 over which a stream of material, as at 38, is fed. This material will, because of the action of the pick-up means P and beater B, be in such condition that its stalks, stems and the like will lie randomly but predominantly lengthwise of the path of feeding, which may be regarded generally as indicated by the arrow 40. The feed means in this case is represented by a packer member 42 having a combination spring and pivot connection 44 to one arm 46 of a bell crank 48, the other arm 50 of which is linked at 52 to the crank 30. The bell crank is pivoted at 54 on a further part of the general support means such as that indicated at 10. In the condition of the parts as represented in FIG. 1, the packer member 42 has moved its maximum distance in the direction of the arrow 40 toward the charging zone 34 and has introduced to this zone a charge of material represented by the numeral 56. A stop is provided at 57 to limit movement of the charge to that shown. In order to condition the charge 56 for introduction into the cell 14, it must be severed from the remainder of the material, and for this purpose a cutter 58 is suitably carried for vertical movement by a guide portion 60 of the support means 10. The cutter is linked to the driving crank 30 through the intermediary of a pair of links 62 and 64 which are pivoted to opposite ends of a lever 66 which is in turn rockably carried at 68 on a further part of the support means 10. As the parts move to their FIG. 2 positions, the cutter 58 moves downwardly against the surface 36 to sever the charge 56 from the remainder of the material, and the packer member 42, because of its mounting at 44, drags in a retrograde direction over the material to the left of the cutter. The crank 30, which drives the plunger or wall element 22, is in an upper segment of its counterclockwise rotation. It will be clear, of course, that the bell crank 48 and lever 66 are rockable as distinguished from rotatable.

As the charge 56 is severed by the cutting means 58 from the remainder of the material, it assumes a length in which the stalks, stems and the like span or bridge across the inlet 18 of the resistor element or die cell 14. This disposition of the charge 56 occurs prior to downward movement of the element 22.

FIG. 3 illustrates that phase of the operation in which the charge 56 is tucked into the cell 14 and folded, U-shaped or "hairpin" fashion, the "legs" of the U representing stalk, stem and like portions which lie generally parallel to the path of movement of the plunger 22. The resistor element 12, which includes die cell 14, accomplishes its resistor function just as in the case of any typical baler; that is, the opposed wall portions 16 set up a resistance in the nature of a "choke," and this is augmented by the fact that there will be in the cell 14 and advanced therealong toward the discharge end of the cell, represented here at 70, a previous wafer or pellet 72. As a subsequent pellet is formed of successive charges as at 56, that material is compressed, in the manner to be described subsequently, and concomitant thereto the pellet 72 is advanced toward the discharge end 70, ultimately extending beyond that end to a predetermined extent, such as might be based upon the desired length one wishes the pellet to assume. Any typical means may then be used for breaking off the pellet from the material retained within the cell 14, a representative ejector being suggested at 74, which ejector is capable of movement to the left as seen in the drawings, so as to break off the extrusion product or wafer.

The tucking means for accomplishing the "hairpin" disposition of the charge 56 as represented in FIG. 3 may take the form of a secondary plunger or rod 76 slidably carried within the main plunger 22 which is hollow or tubular as shown and which contains a relatively strong compression spring 78 acting against the interior headed end of the rod 76, the wall or face portion 24 being apertured to accommodate the rod 76. Hence, as the crank 30 rotates from its position of FIG. 2 to that of FIG. 3, the plunger assembly 22-76 moves downwardly, the spring 78 causing the secondary plunger or tucker rod 76 to occupy its extended position. The relative forces and resistances involved in this stage of operation are such that the rod 76, backed up by the spring 78, is capable of tucking the charge 56 into the cell so that it assumes its FIG. 3 condition. This removes the charge 56 from the charging zone 34 and at this particular instant, the packer member 42 is substantially quiescent. That is to say, the mechanism is so designed that the packer member 42 does not feed any material until the compressor means, comprising the elements 12 and 22, assume their material-receiving position as represented by FIG. 1, it being clear that FIG. 4 represents the material-compressing position of those elements.

As the crank 30 continues to rotate from its position of FIG. 3 to that of FIG. 4, the main plunger 22 is advanced into the die cell 14, the spring 78 allowing the rod 76 to be absorbed within the plunger so that the face portion 24 of the main plunger applies forces endwise to the "legs" of the U-shaped charge of stalks, stems and the like. Since the bottom portion of this charge is confined or resisted by the resistor means already described, the stalks, stems and the like are in effect column-loaded and therefore they buckle and crumple so that intermediate portions thereof are displaced laterally in random zig-zag fashion, as illustrated schematically in the drawings. Experience has shown that the zig-zag disposition of the stalks, stems and the like varies according to the type of material and even though absolute regularity or an established pattern is not obtained, the condition that is achieved is such that crumpled or bent portions of each stalk are found to "mechanically" interlock with similar portions on adjacent stalks, stems and the like, with the result that the bond afforded by the interlock or interlace is sufficient to retain the material of the charge. Thus, as the compressor means operates through successive cycles, timed with the feed means because of the linkages and levers already explained, a continuous process is carried out and wafers or pellets are successively ejected at 70-74 as long as the machine or apparatus is continued in operation. It follows, of course, that the severing means 58 is timed with the remainder of the mechanism so that successive charges, as at 56, are cut off from the material to the left of the cutting means. It will also be clear that the mechanism of FIGS. 1-4 may be readily incorporated in that area of the machine M shown at F and G in FIG. 9. Here, of course, considerable room for variation is permitted, depending upon the size, type, capacity, etc. of the ultimate machine. These, however, are governed by considerations beyond the scope of the present invention and which are largely known to those versed in the art.

Figure 5:
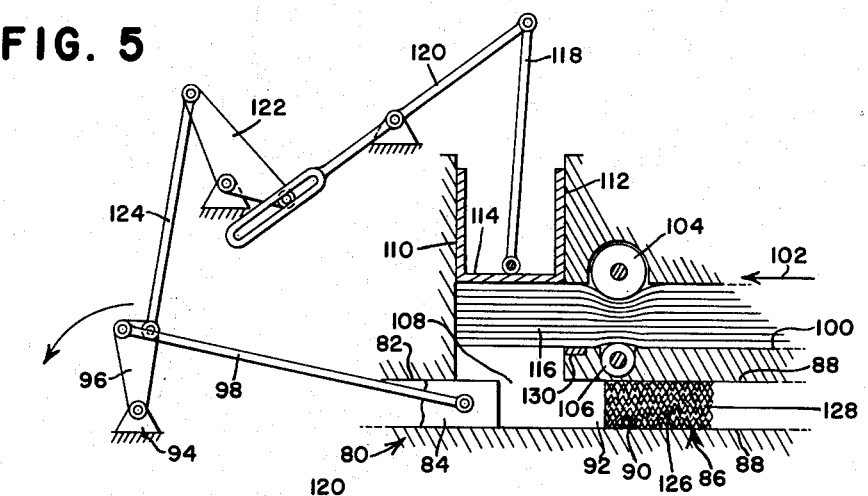
FIG. 5 is a schematic view, partly in section, of a modified form of apparatus, illustrating the feeding stage.
Figure 6:
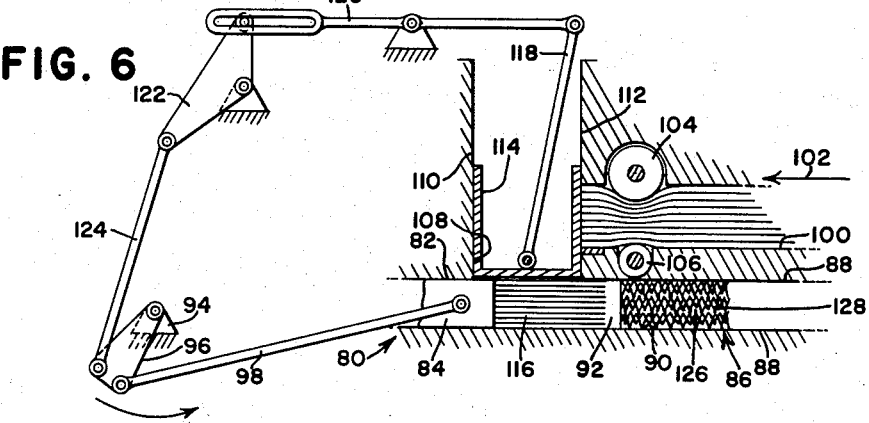
FIG. 6 shows that apparatus in its charging stage.
Figure 7:
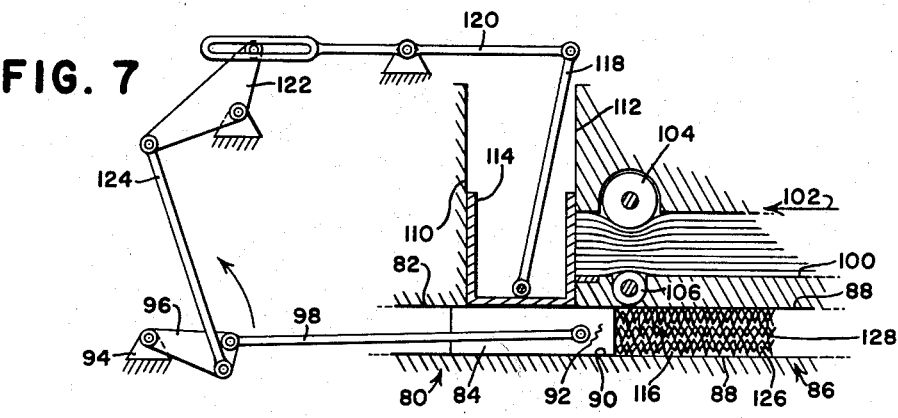
FIG. 7 illustrates the same apparatus in its compressing stage.

*FIGS. 5 through 7*

The general principles outlined in the discussion of FIGS. 1 through 4 will be recognized in FIGS. 5 through 7. Here again a support means is represented as any suitable structure, designated by the numeral 80, one portion of which constitutes a guide 82 for a movable wall element in the form of a plunger 84, and another portion of which represents a resistor element 86, in this case alined with the guide 82 and plunger 84 and having opposed walls 88 to define a die cell 90 having its inlet 92 facing toward or in opposed relation to the wall element 84. A portion of the support 89 as at 94 affords a bearing for a rotatable arm 96 which normally rotates counterclockwise, as indicated. This arm is linked by a pitman 98 to the plunger 84 so that as the arm 96 rotates, the plunger 84 is reciprocated or moved back and forth along a path generally normal to the front face of the wall or plunger, which path of course extends centrally through the die cell 90.

That portion of the structure which defines one of the walls 88 of the cell 90 may also define a table or surface 100 over which material, such as that already described, is fed in the direction of the arrow 102. The feed means, which may be contained in the area F of FIG. 9, is here represented as including rollers, such as 104 and 106, operative to move the material in such condition that its stalks, stems and the like are oriented generally in parallelism for presentation to a charging zone 108, in this case just above the elements 84-88 when said elements occupy what may be regarded as a material-receiving position, as distinguished from the material-compressing position of FIG. 7.

As material is advanced adjacently to the charging zone 108, it is stopped by a wall portion 110 which cooperates with an opposed wall portion 112 in affording a guide for a secondary feeder or charger 114, here in the form of a plunger which engages the charge of material, as at 116 and which moves that charge between the compressor elements as shown in FIG. 6. The plunger or charger is appropriately linked to the arm 96 for the plunger 84 by means of a pitman 118, a rocker 120 and a rockable arm 122 which in turn is linked at 124 to the rotating arm 96. The mechanism is timed so that as the plunger 84 is retracted to the FIG. 5 position, the other plunger 114 is retracted upwardly so that the material may be fed by the means 104-106 adjacently to the charging zone 108. As the rotating arm 96 moves from its position of FIG. 5 to that of FIG. 6, it carries the compressor plunger 84 farther to the left and simultaneously the charging plunger 114 moves downwardly to introduce the charge 116 into the relatively wide space between the plunger 84 and inlet 92 of the resistor element 86. Here again, a previously formed wafer or pellet, as at 126, which is following a still previously formed pellet or wafer as at 128, affords part of the resistance, the remainder of course being afforded by the walls 88 of the resistor element. As best seen in FIG. 6, the stalks, stems and the like are introduced between the elements 84 and 86 in such condition that they lie with their lengths generally oriented parallel to the path of movement of the element or plunger 84. Hence, as the plunger 84 moves from the position of FIG. 6 to that of FIG. 7, endwise pressure is applied to the material, causing the material to crumple and buckle and to displace intermediate portions thereof randomly in zig-zag fashion to accomplish the type of interlock described above in connection with FIGS. 1-4. The rolls 104 and 106 are designed to move the material continually against the side of the charging plunger 114 which temporarily obstructs the line of feeding (FIG. 7) so that when the plunger is retracted to its FIG. 5 position the material is introduced across the gap for ultimate introduction through the charging zone 108 and into the space between the plunger 84 and the resistor element 86, the plunger 84 of course ultimately moving back to the position of FIG. 6 and then moving again to its position of FIG. 7, the successive cycles being repeated so that pellets are continuously compacted and formed in the die cell 90. As in the case of FIGS. 1-4, the pellets may be discharged at the right hand side of the structure by any suitable means.

The packer or charging plunger 114 serves an additional function, in that it combines the function of severing means, the lower right-hand corner thereof being cooperative with a fixed shear bar as at 130, for severing the charge 116 from the remainder of the material. As already indicated, the same basic principles of compressing the stalks, stems and the like endwise so as to cause them to buckle or crumple, is exploited, just as it was in the apparatus of FIGS. 1–4.

FIG. 8

This form of the invention involves a pair of rotatable support means, each of which is preferably identical and therefore will be identified by the same reference numeral, here 132. Each support means is in the form of an annulus and is rotatable about its own shaft as at 134, the shafts being parallel and the annuli moving respectively in opposite directions, the upper rotating clockwise and the lower rotating counterclockwise. It will be further noted that the outer peripheries of the annuli are in what may be regarded as rolling contact with each other. Any suitable drive means may be employed for causing rotation of the annuli.

In the area where the peripheries of the annuli 132 meet or contact, there is formed a bite or charging zone 136 to which material is fed in the direction of the arrow 138 by feed means, here comprising a pair of oppositely running endless belts 140. These may be incorporated in the area F of FIG. 9, and the means 132 may be incorporated in the area G of that figure. Here again there is exploited the principle of feeding the material to the charging zone in such condition that the stalks, stems and the like thereof lie or are oriented generally parallel to the path of movement. In general, the quantity of material fed to the charging zone 136 is broken down into separate charges and is fed successively to die cells 142 in the annuli 132. In the case of each annulus, the die cells 142 are uniformly circumferentially spaced and extend generally radial, each having its inlet 144 at the outer periphery of the annulus. Each die cell is separated from its neighbor by a rigid radial wall portion 146, which in this case constitutes a resistor element. A circumferentially opposed portion of each die cell comprises a movable wall element 148. As will be brought out more specifically below, the timing of rotation of the annuli is such that the inlets 144 of the die cells 142 of each annuli successively register radially with the outer faces 150 of the fixed resistor or wall parts 146 of the cells of the other annuli, the result being that the faces 150 of one annulus successfully force charges of material into the die cells of the other annulus. This will be clear from the radial registration of the two components just referred to as indicated on a line which extends substantially diametrically between the two shafts 134.

It will be clear that the circumferentially spaced apart transverse edges of each portion 150 are relatively sharp and therefore operate to separate charges of material from the material stream and at the same time cause this material to be introduced into the die cell at the time when the two walls 148 and 146 are most widely spaced apart, which is the receiving position thereof, represented by the lowermost die cells 142 in the upper annulus and the uppermost die cells in the lower annulus 132 in FIG. 8.

Each annulus is provided with a circle of pivots 152, equal in number and circumferential spacing to the die cells 142 of that annulus. Each pivot carries thereon a control arm 154 which is pivotally connected adjacent to its outer end to the associated movable wall 148. Each arm is in the form of a bell crank having at its end at the other side of its pivot 152 a cam follower or roller 156 which rides in a fixed cam track 158 so that as the annulus rotates relative to the cam track 158 the rollers 152 derive force therefrom and transmit this force into proper movement of the arms 154 which in turn control movement of the associated wall elements 148 back and forth toward and away from the respective opposed fixed wall portions 146. Stated broadly, each wall element 148 is a movable wall element and each element 146 is a resistor or fixed wall element. As will be clear from the drawing, the charge of material introduced to each die cell is in such condition that the stalks, stems and the like lie with their lengths generally normal to the path of movement of the wall 148. Since the wall 148 is pivoted to its arm 154, its path of movement will be generally circumferential but the pivot will allow slight deviations, which is largely immaterial, the point being that endwise pressure is applied to the stalks, stems and the like so as to cause same to buckle in the manner already described in connection with the other forms of the invention.

Although portions of the annuli are broken away and other portions are omitted in the interests of clarity, the complete structure can be readily visualized on the basis of what is shown. In addition to the cam track 158, there is a second fixed cam track 160 which receives a plurality of rollers 162, equal in number to the die cells 142 in each annulus. Each roller 162 carries one end of an ejector plunger 164, the other end of which is slidably guided at 166 by an appropriate portion of the annulus at what may be regarded as the bottom of the associated die cell 142. The plunger is headed at this point to provide a relatively wide area at 168 which temporarily confines the charge of material so that it does not pass radially inwardly through the annulus. Considering each die cell in its material-receiving condition as a box having its open end facing radially outwardly, it follows that this "box" is capable of receiving material in condition and manner aforesaid. As the annuli rotate in their respective directions of rotation, the cam track 158 and associated rollers 152 cause the arms 154 to move from their open or material-receiving positions to their closed or material-compressing conditions, the latter being best illustrated in the upper portion of the upper annulus 132 in FIG. 8, in which area the crumpled or buckled condition of the stalks, stems and the like will be seen. As the annuli continue to rotate, the compressed wafers are further compressed until they reach what may be regarded as a discharge area, generally indicated at 170, at which point, in the case of each annulus, the associated ejector plunger 164 is projected radially outwardly to move the completed pellet out of the annulus, such as indicated at 172. The discharged pellets may be appropriately guided for receipt by or transfer to any suitable conveyor or receptacle, the details of which are not material here. As the annuli continue to rotate, the ejector plungers are retracted, which is clear from the illustration at the bottom of the upper annulus and the top of the lower annulus in the drawing, retraction of each plunger substantially coinciding with movement of the associated movable wall 148 to its material-receiving position.

Another point that is worthy of note is that before each ejector plunger 164 moves to its ejecting position, the associated movable wall 148 is beginning to move again to its material-receiving position, hence clearing itself from the path of the outwardly moving ejector plunger. That is to say, as illustrated in the upper portion of the annulus 132 in FIG. 8, the wall portions 148 appear to be in the path of outward movement of the ejectors 164. However, as indicated, by the time these die cells move to the discharge area 170, the movable walls 148 have retracted circumferentially so as to allow ejection of the pellet at 172.

Conclusion

The foregoing are but illustrative examples of different forms of apparatus used to exploit the novel principle of compressing the stalks, stems or the like endwise so as to cause them to buckle randomly and thereby to establish what has been termed a mechanical interlock with adjacent stalks, stems and the like not only in the same charge but in preceding and subsequent charges. It will thus be seen that there has been accomplished the principal object of the invention; namely, the provision of apparatus for achieving this new system or process of wafering or pelleting. On the basis of the broad teachings outlined herein, various modifications in the forms of the invention illustrated, or their equivalents, could be resorted to. Therefore, the present disclosure must be taken as illustrative only and not as limiting, since the scope of the invention is deemed to be relatively wide.

What is claimed is:

1. Wafering apparatus for handling forage and similar material that is made up largely of stalks, stems and the like, including support means; compressor means on the support means comprising a wall element and a resistor element arranged in opposed relation; means mounting the elements for back and forth movement of one relative to the other along a path generally normal to the wall element and between a material-receiving position in which the spacing between said elements is relatively wide and a material-compressing position in which said spacing is substantially reduced; means providing a charging zone adjacent to said elements; means for continuously delivering material to said charging zone in such condition that the stalks, stems and the like lie predominantly parallel to said path; feed means for feeding successive charges of material from said zone and between the elements in their receiving position and in such condition that each charge is substantially equal in length to said spacing of the elements in their receiving position; means for moving said one element in successive cycles between said receiving and compressing positions and thereby to apply endwise pressure to the stalks, stems and the like for causing same to buckle so that portions thereof become displaced laterally of said path to interlock with portions of adjacent material; and means interconnecting and coordinating the feed means and the element-moving means for feeding a charge between the elements each time said receiving position occurs.

2. Wafering apparatus for handling forage and similar material that is made up largely of stalks, stems and the like, including support means; compressor means on the support means, comprising a wall element and a resistor element arranged in opposed relation; means mounting the elements for back and forth movement of one relative to the other along a path generally normal to the wall element and between a material-receiving position in which the spacing between said elements is relatively wide and a material-compressing position in which said spacing is substantially reduced; means for delivering material adjacently to the elements in their receiving position in such condition that the stalks, stems and the like lie predominantly parallel to said path; means for severing from such material a quantity thereof substantially equal in length to said spacing of the elements in their receiving position; feed means for feeding such quantity of material between the elements in their receiving position in such condition that the stalks, stems and the like lie predominantly lengthwise of the path and of such length as to be confined between the elements; and means for effecting movement of said one element to the compressing position and thereby to apply endwise pressure to the stalks, stems and the like for causing same to buckle so that portions thereof become displaced laterally of said path to interlock with portions of adjacent material.

3. Wafering apparatus for handling forage and similar material that is made up largely of stalks, stems and the like, including support means; compressor means on the support means, comprising a wall element and a resistor element arranged in opposed relation; means mounting the elements for back and forth movement of one relative to the other along a path generally normal to the wall element and between a material-receiving position in which the spacing between said elements is relatively wide and a material-compressing position in which said spacing is substantially reduced; feed means for feeding material between the elements in their receiving position in such condition that the stalks, stems and the like lie predominantly lengthwise of the path and of such length as to be confined between the elements; and means for effecting movement of said one element to the compressing position and thereby to apply endwise pressure to the stalks, stems and the like for causing same to buckle so that portions thereof become displaced laterally of said path to interlock with portions of adjacent material.

4. The invention defined in claim 3, in which: the resistor element comprises a pair of wall portions generally parallel to the aforesaid path and closely spaced apart transversely thereof and defining a die cell having an inlet end facing the wall element and spaced therefrom in said receiving position; and the wall element is so dimensioned relative to said cell as to be closely receivable therein when the elements assume their compressing position.

5. The invention defined in claim 3, including: ejector means separate from said elements and operative to eject the material subsequent to compression thereof.

6. The invention defined in claim 3, in which: the resistor element comprises a second wall generally normal to said path and between which and the first mentioned wall element the material is compressed.

7. Wafering apparatus for handling forage and similar material that is made up largely of stalks, stems and the like, including support means; compressor means on the support means comprising a wall element and a resistor element arranged in opposed relation, said resistor element including relatively closely spaced apart wall portions defining a die cell having an inlet facing toward the wall element, and said wall element having a face portion dimensioned to enter said inlet; means mounting the elements on the support means for back and forth movement of one relative to the other along a path generally normal to said wall element and through the cell and between a material-receiving position in which the face portion is spaced away from said inlet and a material-compressing position in which said face portion enters said inlet; feed means for feeding material to the elements in said receiving position thereof in such condition that the stalks, stems and the like lie predominantly crosswise of said path and of such length as to bridge across the inlet; tucking means operative ahead of the face portion and engageable with the material generally centrally of the inlet and movable along said path to tuck the material into the cell in a folded, U-shaped condition with major portions of the stalks, stems and the like lengthwise of said path; means for moving the tucking means; means for effecting relative movement of said elements to their compressing position and thereby to apply endwise forces to the folded material for causing the stalks, stems and the like to buckle so that portions thereof become displaced laterally of said path to interlock with portions of adjacent material; and means for operating the tucking means and the element-moving means sequentially in the order aforesaid.

8. Wafering apparatus for handling forage and similar material that is made up largely of stalks, stems and the like, including: support means in the form of an annulus having a plurality of uniformly circumferentially spaced generally radial die cells, each die cell having compressor means including a radial resistor element and a radial wall element arranged in opposed relation generally circumferentially of the annulus and initially spaced apart in a receiving position to afford an inlet for said cell, said inlets for the cells opening radially at the periphery of the annulus; means mounting the wall elements on the annulus for movement along a path generally circumferentially of the annulus and toward and away from their respective resistor elements to successively narrow and widen the respective cells and to respectively achieve compressing positions and return to receiving positions;

feed means operative to feed material to each inlet when the associated wall and resistor elements for such inlet occupy their receiving position and in such condition that the stalks, stems and the like lie predominantly lengthwise of the path and of such length as to be confined between the elements; and means for effecting movement of each wall element to its compressing position and thereby to apply endwise pressure to the stalks, stems and the like for causing same to buckle so that portions thereof become displaced laterally of said path to interlock with portions of adjacent material in the same cell.

9. Wafering apparatus for handling forage and similar material that is made up largely of stalks, stems and the like, including support means; compressor means on the support means, comprising a wall element and a resistor element arranged in opposed relation; means mounting the elements for back and forth movement of one relative to the other along a path generally normal to the wall element and between a material-receiving position in which the spacing between said elements is relatively wide and a material-compressing position in which said spacing is substantially reduced; means for delivering material adjacently to the elements in their receiving position in such condition that the stalks, stems and the like lie predominantly parallel to said path; means for severing from such material a quantity thereof sufficient to enter between the elements in their receiving position; feed means for feeding such quantity of material between the elements in their receiving position in such condition that the stalks, stems and the like lie predominantly lengthwise of the path and of such length as to be confined between the elements; and means for effecting movement of said one element to the compressing position and thereby to apply endwise pressure to the stalks, stems and the like for causing same to buckle so that portions thereof become displaced laterally of said path to interlock with portions of adjacent material.

References Cited by the Examiner

UNITED STATES PATENTS

| | | | |
|---|---|---|---|
| 313,627 | 3/85 | Selz | 100—141 |
| 657,607 | 9/00 | Luzatto. | |
| 729,149 | 5/03 | Fenn | 100—98 X |
| 2,716,318 | 8/55 | Skromme | 56—1 |
| 2,987,987 | 6/61 | Raney et al. | 100—98 |
| 3,015,199 | 1/62 | McKeon et al. | 107—14 X |
| 3,024,721 | 3/62 | Brooks | 100—97 |

FOREIGN PATENTS

| | | |
|---|---|---|
| 196,947 | 5/23 | Great Britain. |
| 830,553 | 3/60 | Great Britain. |

WALTER A. SCHEEL, *Primary Examiner.*

J. D. SEERS, *Examiner.*